(No Model.)  
W. R. WILL.  
DISCOUNT AND INTEREST CALENDAR.  
No. 447,856.  
3 Sheets—Sheet 1.  
Patented Mar. 10, 1891.

Fig. 1.

[Calendar table showing JULY 19 reference, with rows for JULY, AUGUST, SEPTEMBER, OCTOBER, and NOVEMBER, each with dates 1-31 and corresponding day-count numbers.]

Witnesses.  
O. C. Smith  
J. W. Bolman Jr.

Inventor  
William R. Will  
by Price & Stuart  
Attorneys.

(No Model.)   3 Sheets—Sheet 2.

W. R. WILL.
DISCOUNT AND INTEREST CALENDAR.

No. 447,856.   Patented Mar. 10, 1891.

*Fig. 2.*

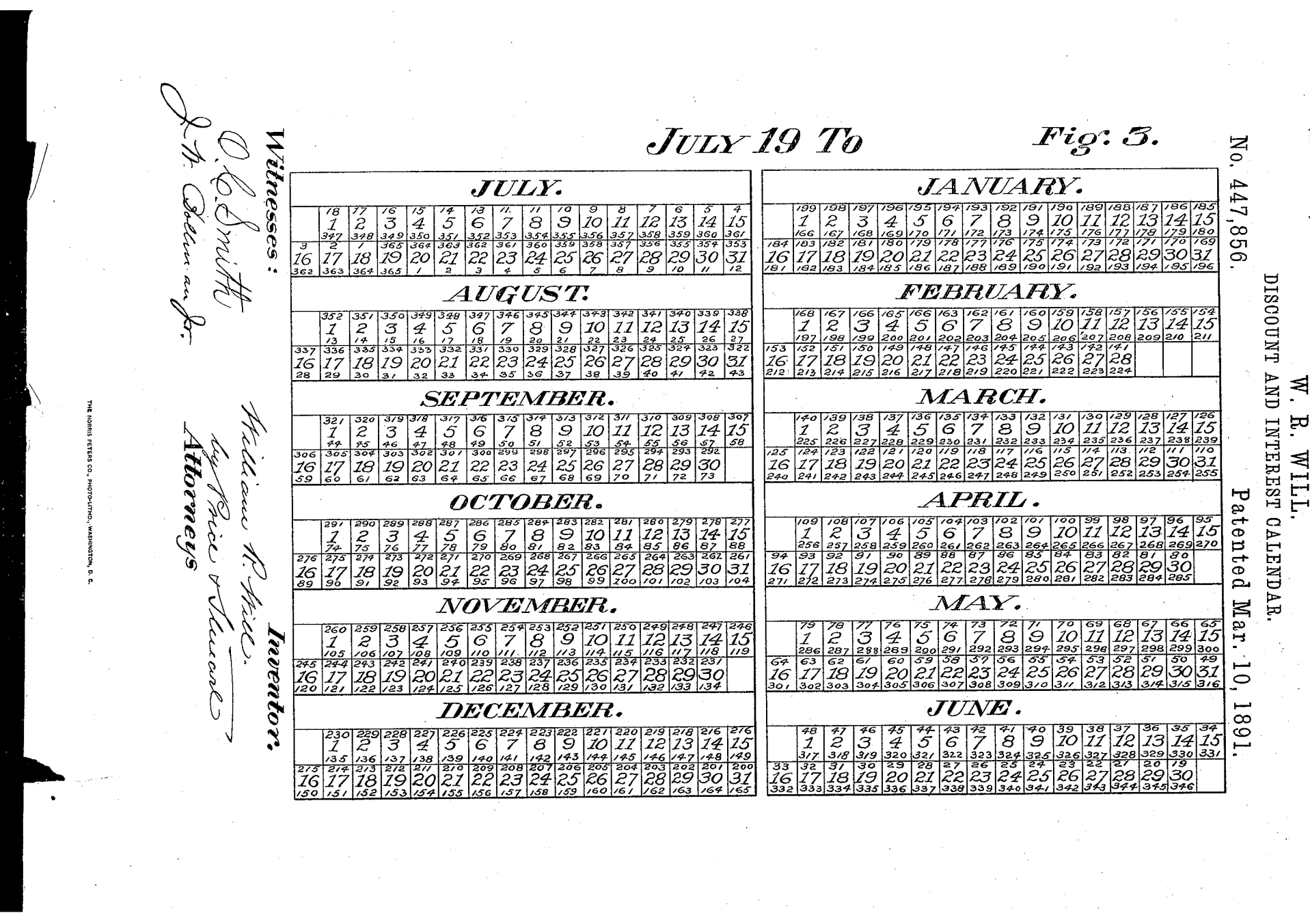

(No Model.)

W. R. WILL.

DISCOUNT AND INTEREST CALENDAR.

No. 447,856. Patented Mar. 10, 1891.

Fig. 3.

JULY 19 To

Witnesses:
O. C. Smith
J. W. Dollman Jr.

Inventor.
William R. Will
by Price & Stuart
Attorneys

UNITED STATES PATENT OFFICE.

WILLIAM R. WILL, OF BALTIMORE, MARYLAND.

DISCOUNT AND INTEREST CALENDAR.

SPECIFICATION forming part of Letters Patent No. 447,856, dated March 10, 1891.

Application filed August 16, 1890. Serial No. 362,157. (No model.)

*To all whom it may concern:*

Be it known that I, WILLIAM R. WILL, a citizen of the United States, and a resident of Baltimore city, in the State of Maryland, have invented certain new and useful Improvements in Discount and Interest Calendars, of which the following is a specification.

My invention relates to an improved calendar, which exhibits at a glance the exact number of days between any two dates the interval between which is one year or less, and which also shows the date at which any number of days less than three hundred and sixty-five will fall if counted forward or backward from any certain date selected. I arrange my calendar as a tear-off calendar consisting of three hundred and sixty-five leaflets in form of a pad for a common year and three hundred and sixty-six for a leap year—that is to say, a separate leaflet differing more or less in the matter imprinted thereon, as hereinafter described, for each successive day of the year. For convenience for discounting commercial paper each leaflet of the calendar contains but five months. Nearly all commercial paper is drawn payable in four months or less from the date of issue, and the number of days intervening between the date of discount and the date of maturity of such paper can always be found on a calendar, including the four months which immediately succeed the date of discount.

Figure 2:
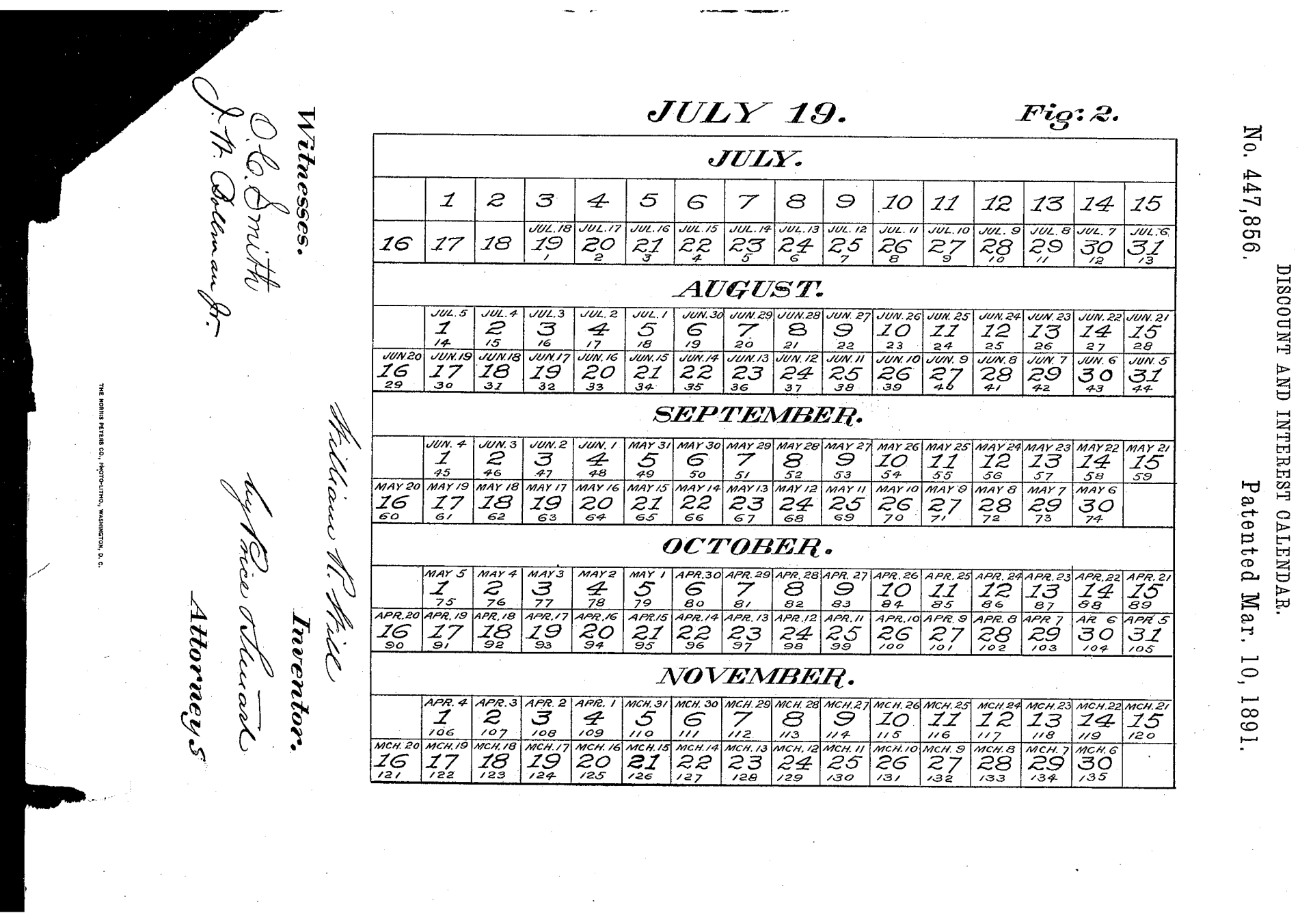

In the drawings, Figure 1 represents the leaflet for July 19, and is arranged to indicate the day of maturity of commercial paper discounted on July 19, counting from the day succeeding July 19, exclusive of day of discount. Fig. 2 is a similar leaflet for July 19, in which the numbers are arranged so as to indicate the day of maturity of commercial paper discounted on that date, including the day of discount. Fig. 3 is the leaflet for July 19, upon which a calendar for the whole year is printed, and by which interest may be calculated back or forward from July 19 by reading the number of days back or forward to any particular date to which it may be desired to calculate the interest.

Referring now to Fig. 1, underneath each calendar date is printed in smaller figures the number of days intervening between it and the date of the leaflet. Counting forward from the date of the leaflet and over each calendar date in small print is the date obtained by counting backward from the date of the leaflet the same number of days as such calendar date is forward from the date of the leaflet.

In using the leaflet shown in Fig. 1, on July 19, for instance, if a note is offered on that date for discount which would legally mature on October 8, the number of days intervening between the date of discount and the date of maturity may be easily determined by simply finding the date of maturity, October 8, upon the calendar, and the figures 81 below the figure 8 of the month of October will indicate that there are just eighty-one days for which interest must be calculated. If, again, a ninety-day note dated May 30 were offered for discount on July 19, the number of days for which interest must be calculated which intervened between July 19 and the day of maturity may be found by finding on the leaflet for July 19 the date of the note, (which is above the calendar date September 7.) Below that calendar date will be seen the figure 50, indicating that fifty days intervene between May 30, the date of the note, and July 19, the date of the leaflet, which deducted from the whole number of days for which the note is to run leaves forty days of the nominal time of the note still to run, to which must be added three days for grace, which makes forty-three days for which interest is to be calculated. Now if it is desired to learn the date of maturity, find on the leaflet the number 40 below the calendar number. This will fall below the calendar date August 28, which will be the nominal date of maturity.

Many bankers and merchants in computing discount on notes include the day of discount and the day of maturity. Where such a practice is in vogue I supply the calendar illustrated on Fig. 2, which is a sample of one of the leaflets used to constitute the calendar. In that calendar the date of the leaflet is indicated as the first date of the discount and the date above the leaflet date on the calendar for the month of the leaflet indicates one day anterior to the date of the leaflet. In using this leaflet, if a ninety-day note dated May 30 be offered for discount on July 19, find, as before explained, the date of the note printed in small type over the calendar date September 26, and the small figures 50 beneath that calendar date must be subtracted from ninety plus one to find the number of days of the nominal time (forty-one) during which the note is still to run.

Referring now to Fig. 3, figure 3, as before stated, represents a leaflet for one day in the year; but on that leaflet is printed a whole year's calendar, as on every other leaflet; but the arrangement is peculiar. The days of each month are arranged in two lines, the first day of each month being located always in the second space of the first line and the succeeding days of the month following the first successively—fifteen days or numbers in the first line and the balance of the days indicated in the second line. This arrangement has the special advantage of always bringing the same days of the succeeding months in the same relative position, which is a great convenience for ready reference. The calculations on this leaflet are made for each day in the year, backward and forward from July 1; or January 1 might be used, if it were desired. Over the figure indicating the 1st day of July is written the number indicating the number of days intervening between July 19 and July 1, counting backward—that is to say, eighteen days. Below the figure 1 of July 1 are the figures 347, indicating the number of days, counting forward, from July 19 to July 1 of the succeeding year. In using this leaflet, if it is desired to find the number of days forward from July 19 to December 3, the small figures beneath December 3 (137) will be the desired number. The number above the date December 3 will be the number of days backward from the date of the leaflet to December 3, (228;) or, reversely, to find what date will fall one hundred and eighteen days after July 19, search for 118 beneath the calendar date in small figures, and the date above this figure, November 14, will be the date desired; or to find what date will fall one hundred and eighteen days prior to July 19, search for 118 in small figures over the calendar date, and the date March 23 will be the date sought.

The leaflet shown in Fig. 3 may be either used as there shown, being one of three hundred and sixty-five, or twelve of these may be selected, those indicating the first day of each month, and used for the same purpose as the three hundred and sixty-five by adding or subtracting, as may be necessary, to get results for any day in the month. Thus, for instance, if it is desired to find the number of days forward from March 14 to July 9 look upon the leaflet for July 1 for the calendar date March 14, and over this calendar date will be found in small type 109, showing that there are one hundred and nine days between March 14 and July 1, and therefore to July 9 there will be eight days additional, or one hundred and seventeen days.

Having thus described my invention, what I claim, and desire to secure by Letters Patent, is—

1. In a calendar, the arrangement of the days of the month in two lines, the first line consisting of fifteen figures from 1 to 15, successively, and the second line consisting of the balance of the numbers of the days of the month, with the number 17 immediately below the figure 1, indicating the first day of the month, and the remaining numbers beneath the numbers succeeding 1, as and for the purpose specified.

2. In a calendar for calculating interest and discount, the combination of three hundred and sixty-five leaflets, on each of which is printed a separate date of the year and also a calendar for the whole of the month in which that day is and calendars for the four succeeding months, the date succeeding the date of the leaflet in the calendar for the month to which the leaflet belongs being numbered 1 in small type and the succeeding date numbers being numbered continuously to the end of the five months upon the leaflet, and the date preceding the date of the leaflet being printed in conjunction with the number indicating the date succeeding the date of the leaflet, and each succeeding date having in conjunction with it a date indicating the number of days backward which it is forward from the date of the leaflet, as and for the purpose specified.

3. In a calendar for calculating interest and discount, the combination of three hundred and sixty-five leaflets, on each of which is printed a separate date of the year and also a calendar for the whole of the month in which that day is and calendars for the four succeeding months, the date of the leaflet in the calendar for the month to which the leaflet belongs being numbered 1 and the succeeding date numbers being numbered consecutively to the end of the five months upon the leaflet, and having the date preceding the date of the leaflet printed in conjunction with the number indicating the date of the leaflet in the calendar of the month of the leaflet, and each succeeding date having in conjunction with it a date indicating the number of days backward which it is forward from the date preceding the date of the leaflet, as and for the purpose specified.

4. In a calendar, the combination of three hundred and sixty-five leaflets, upon each of which is printed a date, one for each day of the year, and a calendar for the entire year, the first month of which is the month of the leaflet, each date of each calendar being printed in conjunction with two numbers, one indicating the number of days intervening between that date and the date of the leaflet counting backward and the other indicating the number of days intervening between that date and the date of the leaflet counting forward.

5. In a calendar, the combination of twelve leaflets, upon each of which is printed a date which shall be the same day of each of the twelve months and a calendar for the entire year, the first month of each yearly calendar being the month of the leaflet and each date on each calendar being printed in conjunction with two numbers, one indicating the number of days intervening between that date and the date of the leaflet counting backward and the other indicating the number of days intervening between that date and the date of the leaflet counting forward.

Signed at Baltimore city, State of Maryland, this 14th day of August, A. D. 1890.

WILLIAM R. WILL.

Witnesses:
HERMAN KERNGOOD,
FELIX R. SULLIVAN.